Aug. 4, 1936.  U. A. WISEMAN  2,050,145
HEAD GATE
Filed July 1, 1935
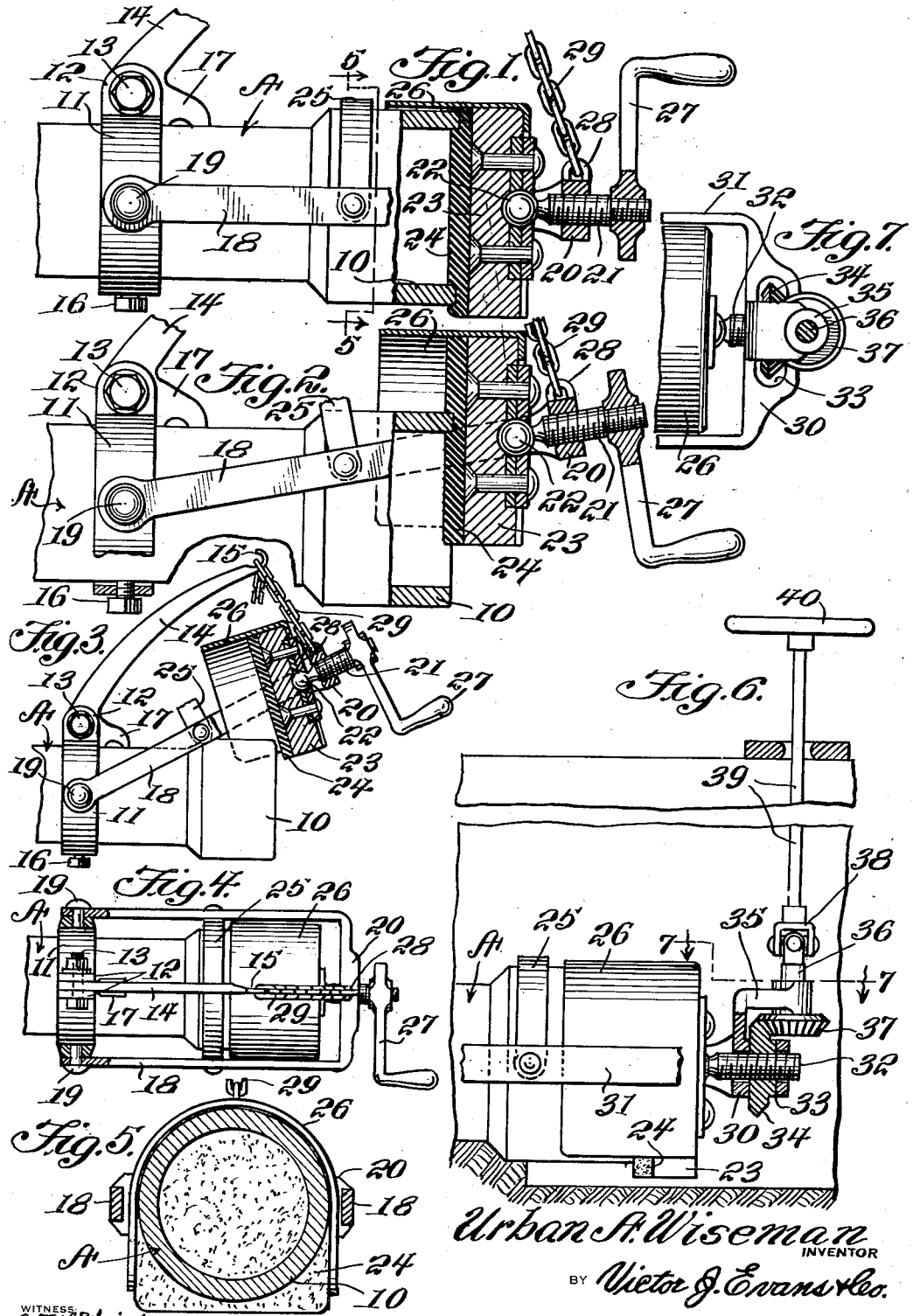
Urban A. Wiseman
INVENTOR
BY Victor J. Evans & Co.
ATTORNEY
WITNESS:
J. T. L. Wright Patented Aug. 4, 1936

2,050,145

UNITED STATES PATENT OFFICE 2,050,145

HEAD GATE

Urban A. Wiseman, Dexter, N. Mex.

Application July 1, 1935, Serial No. 29,389

1 Claim. (Cl. 251—19)

The invention relates to a head gate and more especially to a closure adapted for use in irrigation systems or with any open pipe or conduit, such as those leading from artesian wells, reservoirs, ditches or any place at an outlet system so that the same may be shut off and sealed as the occasion may require.

The primary object of the invention is the provision of a device of this character, wherein the mounting thereof is novel in form and is readily and easily operated to effect the closing of an outlet so that fluid may be shut off and the flow controlled.

Another object of the invention is the provision of a device of this character, which is simple in construction, readily and easily placed at any opening where a cut-off is needed, thoroughly reliable and efficient in its operation, an absolute seal when closed, effecting the flow or control of flow of liquid, it being convenient and easy to operate, no amount of pressure will cause it to stick or bind and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of a conduit partly in section showing the device constructed in accordance with the invention.

Figure 2 is a view similar to Figure 1 showing the device in an adjusted position.

Figure 3 is a view similar to Figure 1 showing a further adjustment of the device.

Figure 4 is a top plan view.

Figure 5 is a sectional view on the line 5—5 of Figure 1 looking in the direction of the arrows.

Figure 6 is a side elevation partly in section of a slight modification.

Figure 7 is a sectional view on the line 7—7 of Figure 6 looking in the direction of the arrows.

Similar reference characters indicate corresponding parts throughout the several views in the drawing.

Referring to the drawing in detail, A designates generally an outlet conduit or pipe having the discharge end 10 and upon this conduit or pipe rearwardly of the discharge end 10 is mounted a clamping collar 11, it being split to provide upstanding spaced parallel ears 12 for receiving a pivot bolt 13 for the mounting of a vertically swinging crane 14 having a free hook end 15. The collar 11 is made fast by a binding screw 16 upon the conduit or pipe A. The crane 14 carries a stop toe 17 which limits the swinging thereof in one direction by the toe contacting with the conduit or pipe.

Swingingly supported by the collar 11 is a bail or yoke 18, the pivots 19 swingingly connecting it to said collar. Threaded centrally in the closed end 20 of this bail or yoke 18 is a feed screw 21, its inner end having a ball 22 for the universal mounting of a head gate 23 thereon. The gate 23 has a sealing packing or gasket 24 which is adapted to engage with the exposed edge of the end 10 of the conduit or pipe A for sealing this end when the head 23 is pressed against the end 10 on the adjustment of the screw 21.

The yoke at an intermediate point thereof carries an upwardly arched bridge piece 25 to straddle the conduit or pipe A when the said yoke or bail has been swung to a position for the confronting of the head 23 with the open end 10 of the conduit or pipe for alignment therewith. The head 23 carries an apron 26 which partially surrounds the conduit or pipe A at the upper half of the same.

The screw at the outer end thereof has detachably fixed thereto a handle or crank 27 for manual operation of the screw 21.

On the closed end 20 of the yoke or bail 18 directly above the screw 21 is an eye 28 having connected therewith one end of a link chain 29 which is susceptible of having its links adjustably engaged with the hook end 15 of the crane 14 so that the latter will sustain the weight of the head gate.

In Figures 6 and 7 of the drawing there is shown a modification wherein the closed end 30 of the yoke or bail 31 having adjustably fitted therein the screw 32 is formed with a clearance 33 for a feed gear 34 which is threaded upon the screw 32 and this end 30 is also formed with a bearing 35 for a stud shaft 36 carrying a pinion 37 meshing with the gear 34 and the stud shaft 36 by the universal joint 38 has connection with an operating stem 39 provided with a hand wheel 40 so that in this manner the head gate can be fed to closed position with respect to the outlet end of a conduit or pipe and such being obvious from said Figures 6 and 7 of the drawing.

The head gate can be adjusted as will be apparent from Figure 2 of the drawing to regulate the flow of fluid through the conduit or pipe A and in Figure 3 the head gate is shown in full open position.

The head gate when closed against the discharge end of the conduit or pipe will seal this end to shut off flow of fluid. The head gate can be of any shape corresponding to the requirements of a closure for an outlet end of a discharge conduit or pipe or the like.

What is claimed is:

A closure for irrigation pipes, stand pipes and like pipes, comprising a split collar embracing said pipe, spaced parallel ears formed from the collar at the split therein, a crane pivotally supported by and between said ears and having a stop toe at its pivoted end for engagement with the pipe for limiting the swing in one direction of said crane, a set screw carried by the collar to make it fast upon the pipe, a bail hinged to the collar, a feed screw threaded in the bail, a head gate having universal connection with the screw for seating upon the open end of said pipe, a sealing packing carried by the head for contact with the said open end of the pipe, and a link chain having one end engaged with the bail and its opposite end adjustably engageable with the crane.

URBAN A. WISEMAN.